United States Patent
Takesako et al.

(10) Patent No.: US 6,716,335 B2
(45) Date of Patent: Apr. 6, 2004

(54) METHOD OF PRODUCING ELECTROLYZED WATER

(75) Inventors: Kiyoyuki Takesako, Yokohama (JP); Shigeru Oyokota, Kyoto (JP)

(73) Assignee: Tominaga MFG. Co., Kyoto (JP)

( * ) Notice: Subject to any disclaimer, the term of this patent is extended or adjusted under 35 U.S.C. 154(b) by 62 days.

(21) Appl. No.: 10/021,842

(22) Filed: Dec. 13, 2001

(65) Prior Publication Data

US 2002/0074237 A1 Jun. 20, 2002

(30) Foreign Application Priority Data

Dec. 19, 2000 (JP) ........................................ 2000-384641

(51) Int. Cl.$^7$ ........................... C02F 1/467; C01B 13/10
(52) U.S. Cl. ..................... 205/626; 205/701; 205/742
(58) Field of Search .................... 205/701, 742, 205/626

(56) References Cited

U.S. PATENT DOCUMENTS 4,761,208 A * 8/1988 Gram et al. ................... 204/95
5,858,201 A * 1/1999 Otsuka et al. ............... 205/701

FOREIGN PATENT DOCUMENTS

| JP | 6-277385 | 10/1994 |
| JP | 2000-317414 | 11/2000 |

OTHER PUBLICATIONS

U.S. patent application Ser. No. 09/947,899 filed Sep. 6, 2001.

* cited by examiner

Primary Examiner—Arun S. Phasge
(74) Attorney, Agent, or Firm—Jordan and Hamburg LLP (57) ABSTRACT

The method of this invention for producing electrolyzed water containing ozone employs an apparatus for producing electrolyzed water from a liquid. The apparatus has two plate electrodes facing each other, a D.C. power source for applying a D.C. voltage across the electrodes and a control circuit for changing a polarity of the electrodes alternately. The method includes the step of producing electrolyzed water by changing the polarity, while a liquid is caused to flow in a flow passage between the electrodes, and the polarity is changed at an interval of time T as defined by formula (10):

$$0.5 \leq T \leq (1/3) \times (L/V) \qquad (10)$$

wherein;

V: Velocity of flow of the liquid in the flow passage (cm/sec.), and

L: Length of the electrodes as measured in the direction of flow of the liquid (cm).

14 Claims, 6 Drawing Sheets

METHOD OF PRODUCING ELECTROLYZED WATER

BACKGROUND OF THE INVENTION

1. Field of the Invention

This invention relates to the production of electrolyzed water having cleansing and sterilizing effects.

2. Description of the Prior Art

Attention has recently been drawn to electrolyzed water as cleansing water. For example, the production apparatus according to Japanese Patent Application Laid-Open No. 317414/2000 is such that a cathode plate having a large number of openings and an anode plate having no opening face each other, and water is caused to flow along the two electrode plates. As a result, there is produced electrolyzed water having a cleansing effect.

On the other hand, the apparatus according to Japanese Patent Application Laid-Open No. 277385/1994 is such that the anode and cathode form therebetween a long labyrinthine flow passage along which water is caused to flow. As a result, there is produced electrolyzed water having a sterilizing effect, as ozone is generated when electrolyzed water is produced.

According to these prior arts, however, it is difficult to raise the concentration of ozone, since ozone is generated only accidentally.

SUMMARY OF THE INVENTION

It is, therefore, an object of this invention to provide a method of producing electrolyzed water having a cleansing effect and a high ozone concentration.

The object is attained by a method in which an apparatus for producing electrolyzed water from a liquid is used for producing electrolyzed water containing ozone, the apparatus having a flow passage formed between and along two plate electrodes located close to each other, a D.C. (direct current) power source for applying a D.C. voltage between the two plate electrodes and a control circuit for changing the polarity of the plate electrodes alternately, the intervals of time T for changing their polarity being set within the range of time as defined by a formula (10) below:

$$0.5\ (sec) \leq T \leq (1/3) \times (L/V) \tag{10}$$

where V: the velocity (cm/sec) of flow of a liquid in the flow passage;

L: the length (cm) of the plate electrodes in the direction of flow of the liquid.

A preferred embodiment of apparatus used for carrying out this invention is an apparatus for producing electrolyzed water from a liquid, which has an electrolytic cell, an inlet means for allowing a liquid forced into the electrolytic cell to flow through, a first electrode plate placed in the electrolytic cell, a second electrode plate placed in the electrolytic cell and facing the first electrode plate, a D.C. power source for applying a D.C. voltage to the first and second electrode plates so as to produce a potential difference therebetween, a control circuit for changing the polarity of the plate electrodes alternately, and an outlet pipe through which electrolyzed water produced in the electrolytic cell is let out of the cell. This apparatus is characterized in that the first electrode plate close to the second electrode plate allows a flow passage to be formed between and along the electrode plates, and that the intervals of time T for changing their polarity can be set between 0.5 and 60 seconds.

For the purpose of this invention, the "plate electrode" means not only a non-perforated (non-apertured) electrode plate not having any through opening allowing a liquid to flow therethrough, or a perforated (apertured) electrode plate having a large number of (for example, 10 or more) through openings allowing a liquid to flow therethrough, but also a metal net, or the like.

It is said that water molecules form a cluster (aggregation of molecules formed by aggregating molecules) by hydrogen bonding which behaves like a macromolecule. The electrolysis of water, however, forms oxygen gas, hydrogen gas and new water molecules as a result of chemical reactions shown by formulas (1) to (3) below.

$$H_2O \rightarrow H^+ + OH^- \tag{1}$$

$$2H^+ + 2e^- \rightarrow H_2 \tag{2}$$

$$4OH^- \rightarrow 4e^- + O_2 + 2H_2O \tag{3}$$

These chemical changes destroy the clusters. As a result, water decreases its surface tension and increases its surface activity and thereby its diffusion through contaminant substances. Electrolyzed water contains a large number of fine bubbles, as of hydrogen and oxygen gases, etc. and owing to cavitation (an infinite number of fine and nearly vacuum cavities formed about the bubbles and producing an impact force when they are broken), the water facilitates the separation of contaminant substances from the material to be washed.

It has been confirmed that the electrolysis of city water lowers its surface tension from 0.0722 N/m to about 0.0716 N/m.

According to this invention, water or an aqueous solution is used as raw water (liquid). As raw water is required to be electrically conductive and contain ions in order to realize the chemical reactions according to formulas (1) to (3), city or well water is usually used as "water", though pure (or distilled) water or ion exchange water can also be used. An aqueous solution may contain salt, or citric acid.

The amount of water which can be electrolyzed is proportional to the amount of an electric current flowing to the electrodes. It is, therefore, necessary to raise the amount of the current as far as possible to perform electrolysis powerfully. According to this invention, the electrodes have a reduced distance therebetween to receive an increased current without relying upon the application of a very high voltage. The distance between the electrodes is usually required not to exceed 3.0 mm and is preferably from about 0.5 to 2.0 mm. In this connection, it is desirable to employ a plurality of electrode units to obtain a large total electrode surface area.

The first electrode plate and second electrode plate are so disposed as to extend substantially in parallel to each other and face each other to thereby have a substantially uniform distance therebetween, so that the surface of each electrode plates may contribute to electrolysis uniformly.

The "facing" each other of the electrode plates means that there is no diaphragm therebetween.

The reduced distance between the electrodes makes it difficult for water to flow into the space therebetween. According to this invention, therefore, one of the electrode plates has a multiplicity of through holes which make it easy for water to flow into the passage between the electrodes. Moreover, deflecting means is provided for directing raw water toward the holes of the perforated electrode plate so that it may flow into the passage between the electrodes. The deflecting means is preferably defined by a multiplicity of nozzles formed in the inlet pipe.

Water entering the flow passage between the two electrode plates flows therethrough with bubbles and flows out through other holes and the top clearance between the two electrode plates. Therefore, the two electrode plates are preferably disposed not horizontally, but along a vertical or inclined plane to facilitate the flow of the water containing bubbles therebetween.

The electrolysis of water produces fine bubbles of hydrogen and oxygen gases. These bubbles serve as nuclei for an infinite number of fine and nearly vacuum cavities which produce an impact force when they are broken. This phenomenon is called cavitation, and the energy which is produced when the bubbles are broken exhibits an effective washing action.

It is sufficient for water to have an ozone concentration of about 1 mg per liter for sterilization. It is generally said that Escherichia coli, virus or spore bearing bacterium are 99% inactivated in about a minute in water having an ozone concentration of 0.01 mg, 1 mg or 2 mg, respectively per liter. At such a level of concentration in water, ozone has only a very low oxidizing power and does not present any problem of rusting the apparatus for producing electrolyzed water, piping, etc.

It is presumed that if water is electrolyzed by using a non-perforated electrode plate and a perforated electrode plate and reversing the polarity of the electrode plates, the generation of ozone gas is facilitated by the phenomena which will now be described.

If the potential of the non-perforated electrode plate is raised, OH (hydroxyl) radicals are formed on the surface of the electrode plate to produce oxygen atoms, and the combination of such oxygen atoms forms oxygen molecules, as a result of the chemical reactions represented by formulas (4) and (5) below:

$$OH+OH \rightarrow O+H_2O \qquad (4)$$

$$O+O \rightarrow O_2 \qquad (5)$$

In other words, an oxygen molecule (oxygen gas) is produced as shown by the chemical reaction formula (3) before. The oxygen molecules produced on the surface of the non-perforated electrode plate flow toward the through openings of the perforated electrode plate to leave the narrow flow passage between the electrodes with water, and show a high concentration in the vicinity of the openings of the perforated electrode plate.

If under these circumstances, the potentials of the electrode plates are reversed (alternated) so that the potential of the perforated electrode plate may be raised, OH radicals are formed on the perforated electrode plate to produce oxygen atoms. Oxygen molecules are produced on the perforated electrode plate in accordance with the chemical reaction formula (5), and show a still higher concentration in the vicinity of its through openings, since oxygen molecules are already concentrated there as stated above. It is, therefore, presumed that it may be easier for oxygen atoms to combine directly with oxygen molecules, thereby the probability of the generation of ozone may be higher, as shown by formula (6) below:

$$O+O_2 \rightarrow O_3 \qquad (6)$$

It is, thus, considered that a high concentration of ozone ($O_3$) can be obtained if the polarity of the non-perforated electrode plate and that of the perforated one are changed and alternated at appropriate intervals of time.

The production method of this invention electrolyzes water powerfully, and thereby destroys clusters of water to lower its surface tension and raise its surface activity. Moreover, the method of this invention produces electrolyzed water which is rich in fine bubbles of hydrogen and oxygen gases, etc., and which is excellent as cleansing water owing to not only its surface activity, but also its cavitation effect, even if no detergent may be used.

According to this invention, it is possible to produce electrolyzed water having not only a cleansing power, but also a sterilizing power, since its ozone concentration can be raised by changing the voltages applied to the electrodes at appropriate intervals of time.

As regards the pH (hydrogen ion exponent) of the electrolyzed water which is produced, it maintains the neutral level of the original water. It does not have any chemical substance added thereto, but is environment-friendly.

Moreover, the electrolyzed water produced by the method of this invention has an oxidation-reduction potential which is sufficiently lower than −100 mV to enable the rust-proofing of the cleansing apparatus and its piping.

Tap water generally contains chlorine ions at a concentration of about 10 to 20 mg per liter. If such tap water is electrolyzed, chlorine ions release electrons to the electrode plate and produce chlorine gas in water, as a result of the chemical reaction represented by a formula (11) below:

$$2Cl^- \rightarrow 2e+Cl_2 \qquad (11)$$

The chlorine gas produced in water reacts easily with hydroxide ions in water and forms a chlorine ion and residual chlorine $ClO^-$ as a result of the chemical reaction represented by a formula (12) below:

$$Cl_2+2OH^- \rightarrow Cl^-+ClO^-+H_2O \qquad (12)$$

The residual chlorine $ClO^-$ is not a very strong oxidizing agent, but is a substance having a bleaching action and a sterilizing action.

Ozone has a strong sterilizing power immediately after its formation, but is said to have a life of only several seconds to several tens of minutes in water. On the other hand, residual chlorine maintains its sterilizing effect for a long time, though its sterilizing power may be low.

If tap water containing chlorine ions is electrolyzed by the apparatus as described above, it is possible to produce ozone and residual chlorine together, as stated above. Thus, there is produced electrolyzed water having a strong sterilizing power owing to ozone immediately after the electrolysis of tap water and maintaining a certain level of sterilizing power owing to residual chlorine even after the passage of a long time.

An assay for its sterilizing effects on various kinds of bacteria confirmed the effectiveness of water not only immediately after its electrolysis, but also after 24 hours of storage.

Instead of alternating the potentials of the electrode plates as stated above, there is no necessity of alternating the potentials of the electrode plates if the electrode plates vary in form from non-perforated to perforated and from perforated to non-perforated along the flow passage of water.

Thus, another preferred embodiment of apparatus used for carrying out this invention is an apparatus for producing electrolyzed water from a liquid, which has an electrolytic cell, an inlet means for allowing a liquid forced into the electrolytic cell to flow through, a first electrode plate placed in the electrolytic cell, a second electrode plate placed in the electrolytic cell and facing the first electrode plate, a D.C. power source for applying a D.C. voltage to the first and second electrode plates so as to produce a potential difference therebetween, and an outlet pipe through which electrolyzed water produced in the electrolytic cell is let out of the cell. This apparatus is characterized in that the first electrode plate close to the second electrode plate allows a flow passage to be formed between and along the electrode plates, and that each of the two plate electrodes has non-perforated and perforated portions formed alternately and in such a way that each non-perforated portion of one electrode faces a perforated portion of the other.

It is considered that a small amount of ozone is generated even by electrolyzing water without changing the potential applied between the electrode plates, as stated before in connection with the prior art. In that case, however, the gradual deposition of scales of hydroxides composed of calcium, magnesium, etc. on the cathode plate gradually makes the flow of an electric current difficult and brings about a lowering in the efficiency of electrolysis resulting eventually in the generation of hardly any ozone.

Because their polarity is changed before any scale is deposited on the electrodes, if the time to wait for each change of polarity is shorter than a certain level, it is presumed that the generation of ozone is facilitated to some extent even without any through opening, that is, by applying a DC voltage to two non-perforated electrode plates and alternating their polarity. It is also presumed that the generation of ozone is likewise facilitated by applying a D.C. voltage to two perforated electrode plates in an alternating way.

DESCRIPTION OF THE PREFERRED EMBODIMENTS

This invention will become more apparent from the following description of its preferred embodiments made with reference to the accompanying drawings. The embodiments and drawings are, however, merely for purposes of illustration and explanation. The scope of this invention is defined solely by the claims. The same reference numerals denote the same or equivalent parts found in a plurality of the accompanying drawings.

The preferred embodiments of this invention will now be described with reference to the drawings.

FIG. 1(a), FIG. 1(b), FIG. 2 and FIG. 3 show an apparatus for the production of electrolyzed water according to the first embodiment.

An electrolytic cell 1 is provided therein with a pair of electrode units U. Each electrode unit U has a non-perforated (or first) electrode plate 2 and two perforated (or second) electrode plates 4 each having a large number of through openings 5. The perforated electrode plates 4 are so mounted as to face the two sides, respectively, of the non-perforated electrode plate 2 and form a certain clearance Δ therebetween. Inlet pipes (inlet means) 20 are connected into the electrolytic cell 1 through its bottom so as to face the perforated electrode plates 4. Moreover, an inlet pipe (inlet means) 21 having an open top is mounted at the bottom of the electrolytic cell 1. An outlet pipe 22 is mounted at the top of the electrolytic cell 1 for letting out electrolyzed water produced therein.

Figure 1A:
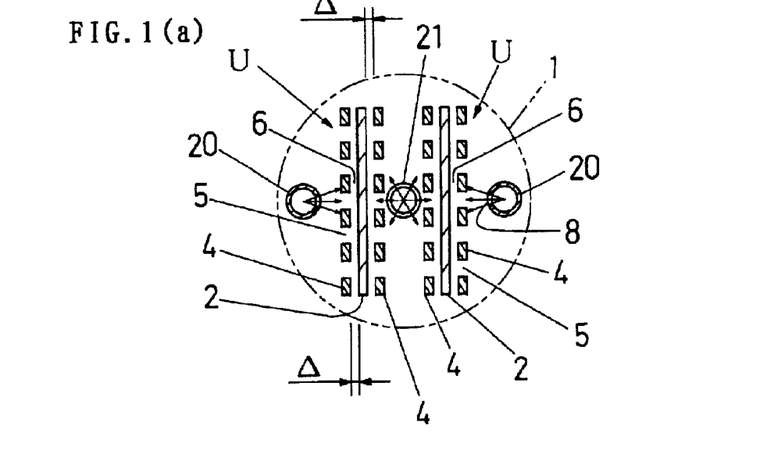
FIG. 1(a) is a top plan view showing an apparatus for the production of electrolyzed water according to a first embodiment of this invention.
Figure 1B:
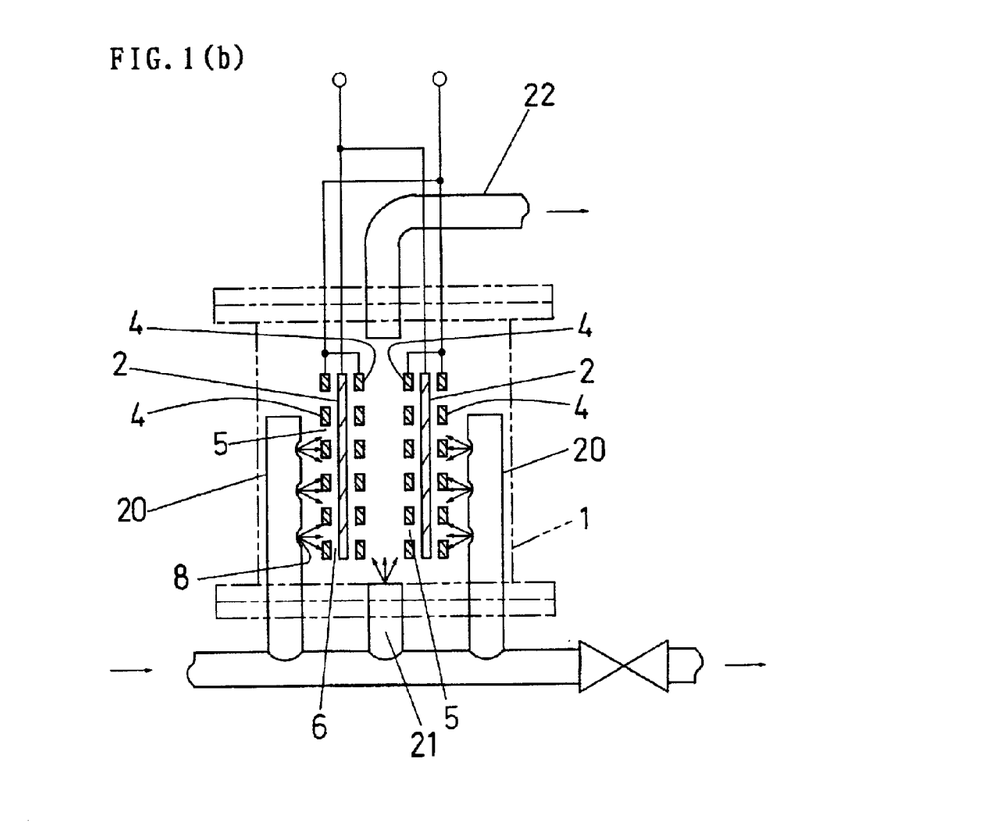
FIG. 1(b) is a front elevational view thereof.

The inlet pipes 20 have a large number of nozzles 8 formed for jetting out water against the surfaces of the perforated electrode plates 4, and if water is forced into the electrolytic cell 1 through the inlet pipes 20 and 21, it is discharged toward the perforated electrode plates 4 through the top of the inlet pipe 21 and the nozzles 8. This discharged water passes through openings 5 into the spaces between the non-perforated and perforated electrode plates 2 and 4. The inflowing water passes through the flow passages 6 each formed to have the clearance Δ and flows up along the electrode plates 2 and 4, or out through other through openings 5.

The inlet pipes 20 are closed at their tops.

Figure 2:
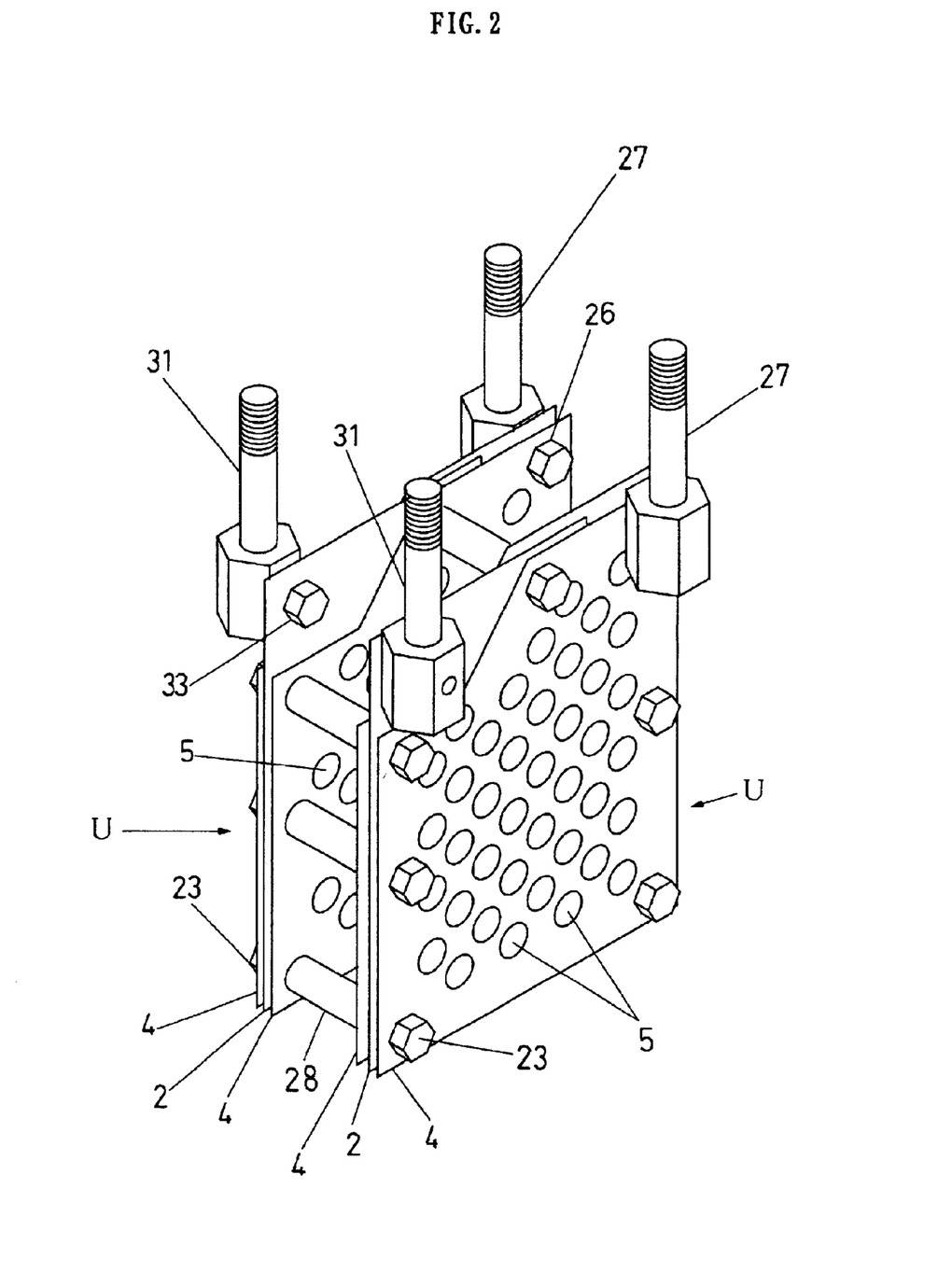
FIG. 2 is a perspective view of the electrode units according the first embodiment.

Description will now be made of the construction of each electrode unit U shown in FIG. 2.

Figure 3:
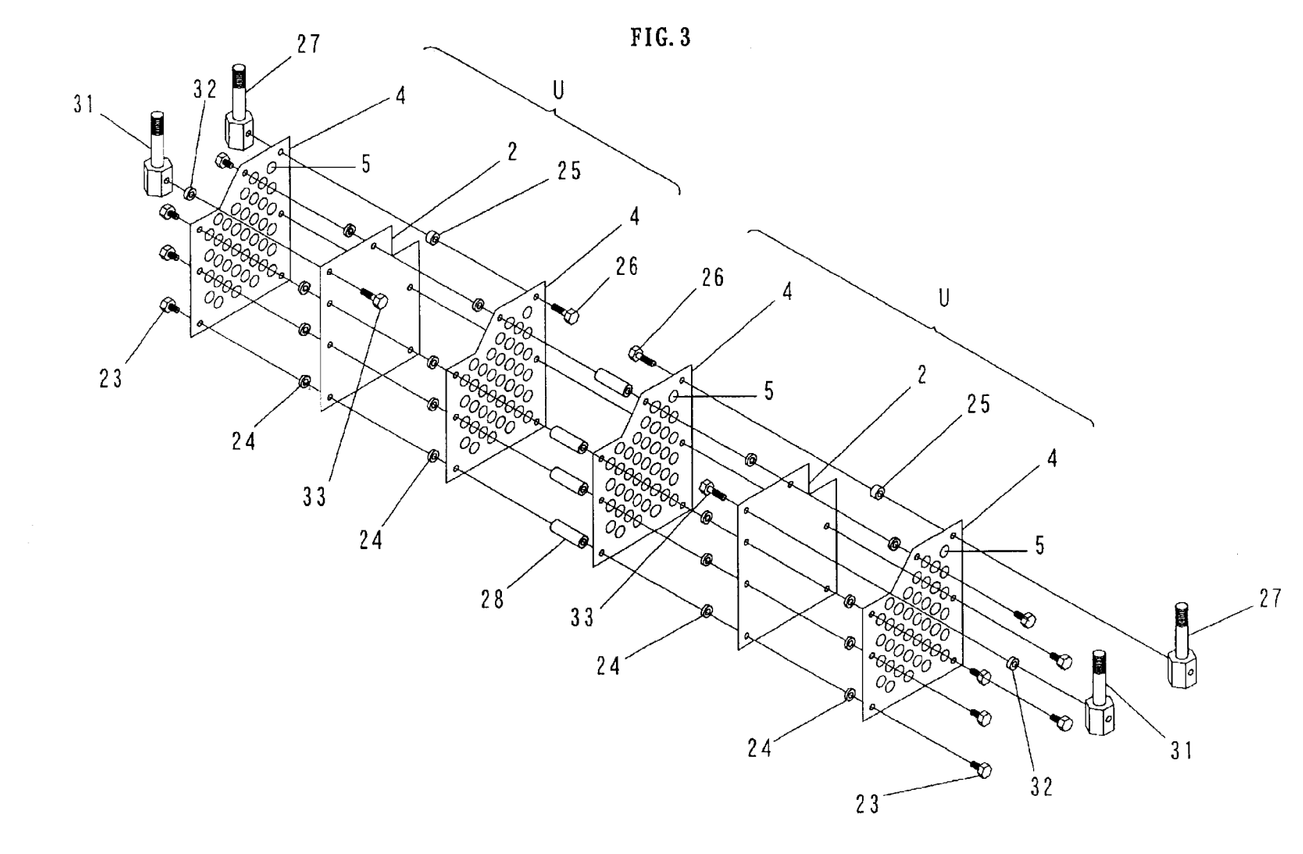
FIG. 3 is an exploded assembly view of the electrode units.

A plurality of first insulating spacers 24 are interposed between the non-perforated and perforated electrode plates 2 and 4, as shown in FIG. 3. A plurality of elongate second insulating spacers 28 are disposed between the pair of electrode units U, U, and the electrode plates 2 and 4 are held together by a plurality of insulating bolts 23 so as to maintain a certain distance therebetween. The perforated electrode plates 4 are secured to a second electrode connecting rod 27 by a conductive bolt 26 via a conductive spacer 25. The non-perforated electrode plate 2 is secured to a first electrode connecting rod 31 by a conductive bolt 33 with a conductive spacer 32 held therebetween.

If a voltage is applied to the non-perforated and perforated electrode plates 2 and 4 when the electrolytic cell 1 is full of water and discharges water through the outlet pipe 22, water is electrolyzed to generate oxygen and hydrogen gases on the electrode plates 2 and 4. These gases rise toward the top of the electrolytic cell 1 through the through openings 5 of the perforated electrode plates 4 and the flow passages 6 and are let out through the outlet pipe 22 with electrolyzed water also produced.

The nozzles 8 formed in the sidewall of each inlet pipe 20 preferably have a total area which is larger than the cross-sectional area of the inlet pipe 20, so that there is no difference in output pressure from one nozzle 8 to another.

It is effective to include a stirrer, such as a stirring fin, in the electrolytic cell 1 so that after discharge toward the perforated electrode plates 4 through the inlet pipes 20 and 21, water and gases resulting from electrolysis may be mixed uniformly with raw water.

FIG. 1(b) shows the perforated electrode plates 4 connected together and also the non-perforated electrode plates 2 connected together, so that a single power source may be used to apply a D.C. voltage. It is, however, possible that a difference in the clearance Δ between the electrode plates or their surface conditions, etc. may cause different amounts of electric current to flow through the two electrode units U. It is, therefore, preferable to provide a function which may be adjustable to ensure that substantially the same amount of electrolysis be performed in each the electrode units by connecting an independent constant-voltage power source to each electrode unit U.

It is more preferable to use a constant-current power source instead of the constant-voltage power source to have the same amount of electrolysis performed by the electrode units, as no voltage adjustment is necessary. It is also beneficial to provide the outlet pipe 22 or the inlet pipes 20 and 21 with a flow sensor (not shown) so that a voltage may be applied to the electrode units U only when the supply of water into the electrolytic cell 1 through the inlet pipes 20 and 21 has been detected by the sensor.

The through openings 5 of the perforated electrode plates 4 are intended for facilitating the flow of water into the flow passages 6 and allowing the resulting hydrogen and oxygen gases to leave the clearances between the electrodes. Therefore, the openings 5 may be round, elongate, cross-shaped or square holes, or slit-like elongate openings, and the perforated electrode plates 4 may be of, for example, an expanded metal. It is also possible to form a plurality of through openings in the non-perforated electrode plates 2, too, to open flow passages extending across the non-perforated and perforated electrode plates 2 and 4.

Figure 4A:
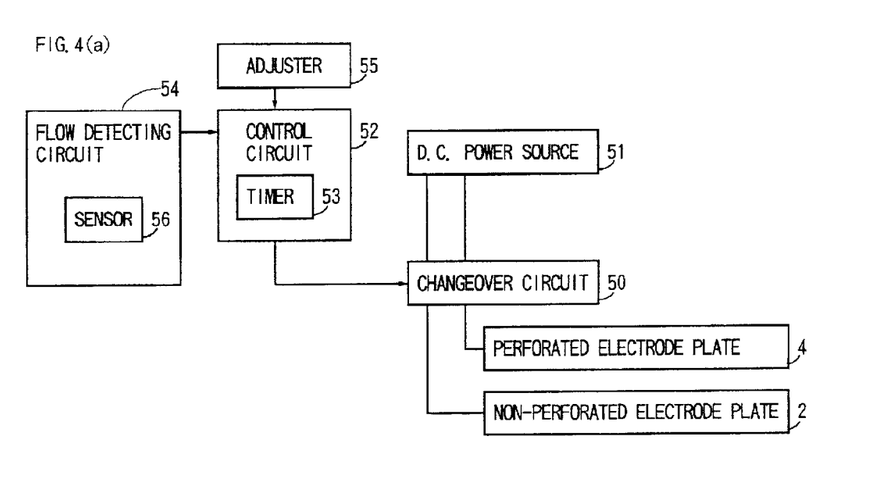
FIG. 4(a) is a diagram showing the general layout of the apparatus according to the first embodiment.

FIG. 4(a) shows a block diagram for an electrical circuit by way of example. A D.C. power source 51 is connected to the non-perforated and perforated electrode plates 2 and 4 through a changeover circuit 50, as shown therein. A control circuit (microcomputer) 52 is connected to the changeover circuit 50. The control circuit 52 includes a timer 53 and is connected to a flow detecting circuit 54 and a adjuster 55.

The adjuster 55 is intended for inputting the time T for changing the polarity of the electrodes 2 and 4 and the changeover time T set by the adjuster 55 is stored in the control circuit 52. The flow detecting circuit 54 includes a sensor 56 for detecting the amount of water flowing out of the electrolytic cell 1 (or flowing into the cell 1).

If tap water is supplied into the electrolytic cell 1 and a flow signal is sent from the flow detecting circuit 54 to the control circuit 52, the control circuit 52 controls the changeover circuit 50 to apply plus and minus voltages to the non-perforated and perforated electrode plates 2 and 4, respectively. Upon passage of the set time T, the control circuit 52 causes the changeover circuit 50 to change the polarity of the applied voltages to apply minus and plus voltages to the non-perforated and perforated electrode plates 2 and 4, respectively. Thus, voltages of different polarity are applied alternately to the electrode plates 2 and 4 upon passage of each set time T.

Figure 5A:
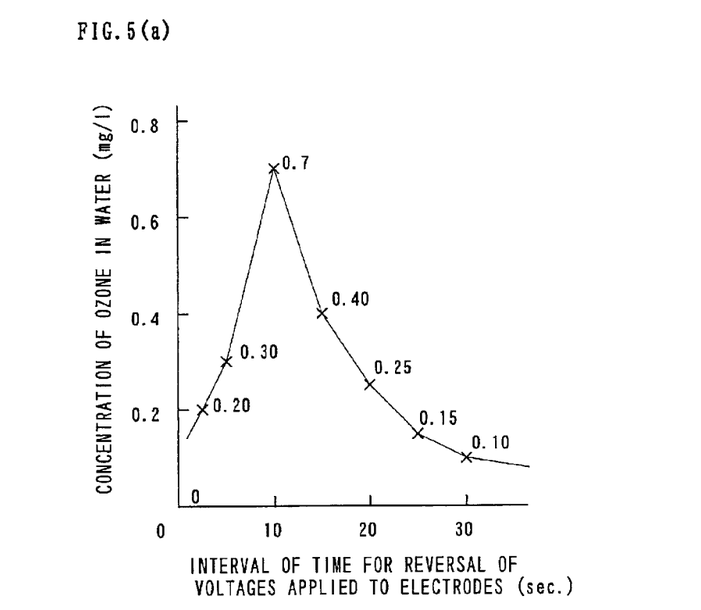
FIG. 5(a) is a graph showing the concentration of ozone generated in water in accordance with the first embodiment.

FIG. 5(a) shows the concentration of ozone in water as actually measured by the inventor of this invention using the apparatus shown in FIG. 1(a) to FIG. 3.

If tap water containing chlorine ions is electrolyzed, residual chlorine is generated with ozone. The residual chlorine is a weak oxidizing agent as compared with ozone, but adds somewhat to the value of ozone concentration to be measured. The value of ozone concentration as measured, however, shows a resulting value of converting the oxidizing power of the residual chlorine included with ozone to that of ozone and can, therefore, be regarded as a reliable value of ozone concentration.

The non-perforated and perforated electrode plates 2 and 4 faced each other in an area of 100 mm wide by 200 mm long, and an electric current of 24 ampere was applied to the electrode units U by the D.C. power source 51. A constant-current power source was used as the D.C. power source 51 to ensure the flow of a constant current of 24 ampere. The electrolytic cell had a diameter of 150 mm. The flow rate of water was set at 3.5 liters per minute. A time T of 2.5, 5, 10, 15, 20, 25 or 30 seconds was set for a changeover of the voltage to be applied. The results are shown in FIG. 5(a). It is obvious from FIG. 5(a) that it is necessary to set a changeover time of 2.5 to 20 seconds to obtain an ozone concentration of 0.2 mg per liter or above.

In order to obtain a high ozone concentration, it is necessary to ensure that the oxygen molecules and oxygen atoms formed on the electrode plates 2 and 4 react with each other satisfactorily. It is presumed that the low ozone concentration at a changeover time below 2.5 seconds was due to reversing the voltages applied to the electrode plates 2 and 4 before the oxygen molecules generated on the non-perforated electrode plates 2 when the non-perforated electrode plates 2 has a potential higher than that of the perforated electrode plates 4 became satisfactorily high.

It is, on the other hand, presumed that the low ozone concentration at a changeover time above 20 seconds was due to the discharge through the outlet pipe 22 of many oxygen molecules that did not form ozone because of the delay in changeover of the voltages applied, though the oxygen molecules genetated on the non-perforated electrode plates 2 were satisfactorily high in concentration.

This apparently has something to do with the relation between the length of the electrode plates and the velocity at which water rises in the electrolytic cell 1. The oxygen molecules generated on the non-perforated electrode plates 2 rise along the flow passages 6 between the non-perforated electrode plates 2 and the perforated electrode plates 4 to leave the passages through the through openings 5 of the perforated electrode plates 4. Therefore, it is desirable to reverse the voltages applied to the electrode plates 2 and 4 when the oxygen molecules generated in satisfactory amounts on the non-perforated electrode plates 2 have reached the through openings 5 of the perforated electrode plates 4.

If the voltages to be applied are set for making a changeover when water has risen to a half of the vertical length of the electrode plates, nearly all of the oxygen molecules generating on the lower half of the perforated electrode plates 4 in the electrode unit U will flow out of the electrode unit U during the movement of water to the upper half of the electrode unit U. Accordingly, the concentration of oxygen molecules which is essential for the generation of ozone is low, that is, ozone is generated only at a low concentration. Thus, it is desirable to make a changeover for reversing the voltages to be applied while water is rising to no more than ⅓ of the vertical length of the electrode plates.

In order to make a changeover for reversing the voltages applied while water is still rising to ⅓ of the vertical length of the electrode plates, or less, it is necessary to satisfy the requirements of $VT \leq L/3$ in which V (cm/sec.) is the velocity at which water rises in the electrolytic cell 1, L is the vertical length of the electrode plates and T (sec.) is the changeover time.

As V=0.33 cm/sec. and L=20 cm when the measurements shown in FIG. 5(a) were made, the changeover time $T \leq 20.2$ sec. can be obtained by calculation, and is nearly equal to the $T \leq 20$ sec. limit as found from the results of the measurements.

It is also desirable that $T \geq 2.5$ sec., since a changeover time T of at least 2.5 seconds is necessary for the satisfactory generation of oxygen molecules at the non-perforated electrode plates 2 as stated previously. It is also desirable that $T \leq 20$ sec. In order to obtain a high ozone concentration by making the changeover control of the electrodes, therefore, it is desirable to satisfy both of formulas (8) and (9) below, in which V (cm/sec.) is the velocity at which water rises in the electrolytic cell 1, L is the vertical length of the electrode plates and T (sec.) is the changeover time:

$$VT \leq L/3 \tag{8}$$

$$T \geq 2.5 \text{ (sec.)} \tag{9}$$

Thus, it is desirable from formulas (8) and (9) that the changeover time T satisfy formula (13):

$$2.5 \text{ (sec.)} \leq T \leq (1/3) \times (L/V) \tag{13}$$

It is presumed from these results that, while a changeover time T of about 2.5 to 20 seconds is most desirable in accordance with the embodiment of this invention, it will generally be possible to obtain a higher ozone concentration at a changeover time T of about 0.5 to 60 seconds, since the ozone value obtained varies with the shapes of the flow passages and the electrode plates 2 and 4, or the velocity of flow (of water). It is, however, most desirable to set a changeover time T of about 5 to 15 seconds.

Figure 5B:
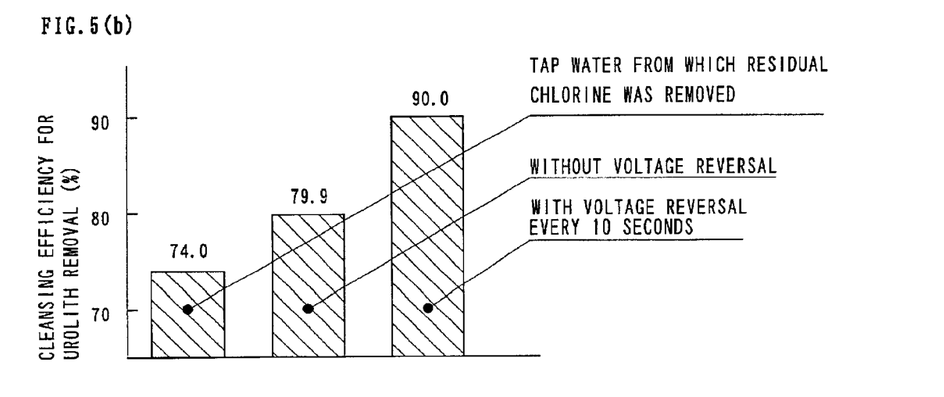
FIG. 5(b) is a graph showing cleansing efficiency for urolith removal.

FIG. 5(b) shows the results of the test conducted by spraying three kinds of water for five minutes at a flow velocity of 3.5 liters per minute against glass on which urolith adhered uniformly, to see to what extent the urolith adhering to the glass surface could be removed. The water used for the test included the tap water from which residual chlorine had been removed, and the electrolyzed water produced by the apparatus as used for the measurements shown in FIG. 5(a). The electrolyzed water was what had been produced by applying to the non-perforated electrode plates 2 a voltage higher than the potential of the perforated electrode plates 4, or what had been produced by making a changeover every ten seconds of the potentials of the non-perforated and perforated electrode plates 2 and 4.

As is obvious from FIG. 5(b), the highest cleansing efficiency for urolith removal could be obtained by using the electrolyzed water produced by making a changeover every ten seconds of the potentials of the non-perforated and perforated electrode plates 2 and 4. This is presumably due to the oxidizing action of ozone against the urolith in addition to the cleansing effect of the electrolyzed water produced by the electrolysis of water.

I, the inventor of this invention, also conducted a test to see the sterilizing effects of the same three kinds of water as had been used for the test of cleansing efficiency for glass on which urolith adhered described in FIG. 5(b). As tap water contained residual chlorine, the water from which the residual chlorine had been removed was used to eliminate any influence of the residual chlorine. Of course, it was also the tap water from which residual chlorine had been removed that was used in the apparatus for producing electrolyzed water. *Escherishia coli* and Legionella were used to verify the sterilizing effects. The *Escherishia coli* had been cultured in a culture medium of trypticase soy agar, and Legionella in a culture medium of a specific agar (WYO α), and bacterially contaminated water was so prepared as to contain 1,000,000 or more bacteria in 1 cc of ion-exchange water. The 1 cc of bacterially contaminated water was put in each 100 cc sample consisting respectively of tap water, electrolyzed water produced without changing the voltages applied to the electrodes and electrolyzed water produced while changing the voltages every ten seconds, and they were left to stand for five minutes after stirring. Then, the 1 cc of each sample was applied to different culture mediums. The culture of *Escherishia coli* was continued at 25° C. for 96 hours, and the culture of Legionella at 37° C. for 96 hours, whereafter the numbers of colonies were counted.

As a result, the tap water from which residual chlorine had been removed did not show any reduction in number of bacteria, but was found to contain 1,000,000 or more bacteria. On the other hand, the electrolyzed water showed that *Escherishia coli* and Legionella were completely removed, and there did not remain any bacteria. Therefore, a clear sterilizing effect could be confirmed.

Thus, the apparatus of this invention can produce from common tap or well water electrolyzed water having both cleansing and sterilizing effects.

The electrolyzed water produced in accordance with this invention can be used for cleansing a wide range of objects including the seeds of white radish sprouts for water culture, which have faced a serious problem in connection with *Escherishia coli* O157, grains, vegetables, cut vegetables, tableware or containers used in a kitchen, apparatus or instruments used in a hospital, endoscopes, devices for storing urine for analysis, linen goods, industrial parts, and toilets or their piping.

The electrolyzed water produced by the apparatus of this invention is also effective as water for immersing soybeans during the manufacture of soybean curd without allowing the growth of bacteria.

Figure 4B:
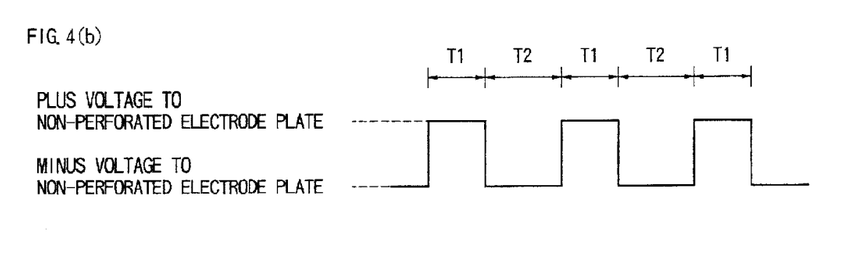
FIG. 4(b) is a time chart showing another mode of changing polarity.

The changeover time T does not always have to be constant, but may alternatively consist of a first and a second changeover time T1 and T2 differing from each other as shown in FIG. 4(b). According to this invention, a cycle of time Tw from change of the polarity of each electrode plate to the restoration of its original polarity may be Tw=(T1+T2), in which case Tw is to be set between one and 120 seconds, preferably between five and 40 seconds.

Although the first embodiment as described above has used a timer for setting the time for changing the polarity of each electrode plate, it is alternatively possible in accordance with this invention not to use a constant current, but to employ means for detecting the amount of an electric current flowing through each electrode plate to control any change in polarity of the electrode plate based upon any variation occurring to the amount of the electric current as a result of the adherence of scales on the electrodes. As a further alternative, it is possible to control any change in polarity of each electrode plate based upon calculations from the amount (or velocity) of water flowing into the electrolytic cell.

Figure 6:
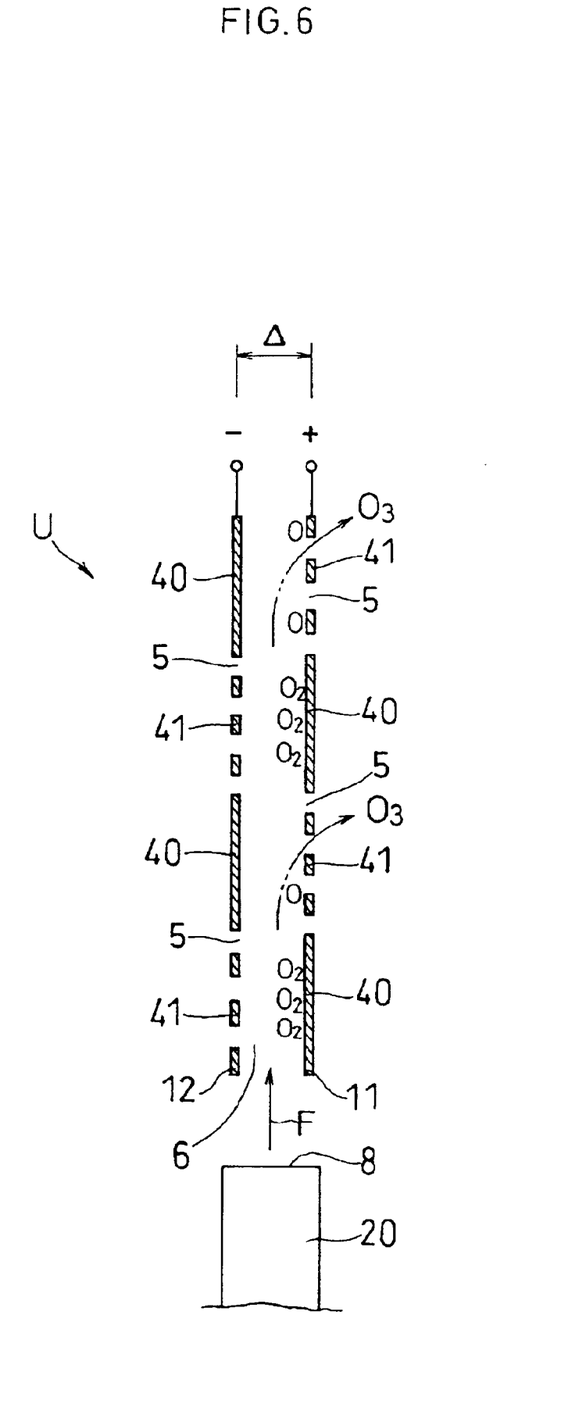
FIG. 6 is a schematic front elevational view of an electrode unit according to a second embodiment of this invention.

FIG. 6 shows a second embodiment of this invention.

An electrode unit U is composed of a first electrode plate 11 as the anode and a second electrode plate 12 as the cathode, as shown. Each of the first and second electrode plates 11 and 12 has non-perforated and perforated portions 40 and 41 appearing alternately along the direction of flow F. The first and second electrode plates 11 and 12 are so arranged that the non-perforated portions 40 of each electrode plate may face the perforated portions 41 of the other. According to this invention, the polarity of each electrode plate is not reversed during the main operation, but only for reverse washing.

In any other aspect of construction, it is similar to what has been described with reference to FIG. 1(b), and the same reference numerals are used to denote like or equivalent parts, so that no detailed description thereof need be repeated.

If the potential of the first electrode plate 11 is raised, oxygen molecules are formed on the surfaces of its non-perforated and perforated portions 40 and 41. The oxygen molecules forming at the non-perforated portions 40 move with water toward the through openings 5 of the perforated portions 41 as shown by two-dot chain lines. Thus, it is presumed that the oxygen molecules combine easily with the oxygen atoms occurring at the perforated portions 41 to form ozone at a high concentration.

According to the second embodiment, it is possible to obtain a high concentration of ozone without making any changeover for the electrodes, since each single electrode plate has both non-perforated and perforated portions 40 and 41.

What is claimed is:

1. A method of producing electrolyzed water containing ozone by using an apparatus for producing electrolyzed water from a liquid, wherein:

the apparatus comprises two plate electrodes facing each other, a direct current power source for applying a direct current voltage across the two plate electrodes and a control circuit for changing a polarity of the two plate electrodes alternately, wherein the two plate electrodes define a clearance of no greater than about 3.0 mm therebetween and define a flow passage extending therealong;

the method comprising a first step, a second step and a third step, in the first step, introducing the liquid into the flow passage, in the second step, applying the direct current voltage across the two plate electrodes by the direct current power source and alternately changing the polarity of the two plate electrodes at an interval of time T by the control circuit to produce electrolyzed water while the liquid is flowing through the flow passage, and in the third step, letting the electrolyzed water out of the flow passage, the first, second and third steps being simultaneously and continuously executed;

wherein the interval of time T is defined by formula (10):

$$0.5 \ (sec.) \leq T \leq (1/3) \times (L/V) \qquad (10)$$

wherein;

V: Velocity of flow of the liquid in the flow passage (cm/sec.), and

L: Length of the two plate electrodes as measured in the direction of flow of the liquid (cm).

2. The method according to claim 1, wherein the time T is set between about 0.5 and 60 seconds.

3. The method according to claim 1, wherein by setting said interval of time T, an amount of oxygen molecules gathered in a vicinity of a one of said two plate electrode is greater than another amount of oxygen molecules gathered in a vicinity of a remaining one of said two plate electrodes, and an ozone concentration in the vicinity of said one of said two plate electrodes is increased in comparison to another ozone concentration in the vicinity of the remaining one of said two plate electrodes.

4. A method of producing electrolyzed water containing ozone by using an apparatus for producing electrolyzed water from a liquid;

the apparatus comprising:
an electrolytic cell;
an inlet for allowing a liquid forced into the cell to flow through;
a first electrode plate placed in the cell;
a second electrode plate placed in the cell and facing the first electrode plate;
a direct current power source for applying a direct current voltage to the first and second electrode plates so as to produce a potential difference therebetween;
a control circuit for changing a polarity of the electrode plates alternately; and
an outlet through which electrolyzed water produced in the cell is let out of the cell;

wherein:
the first electrode plate and the second electrode plate are mutually spaced apart to define a clearance of no greater than about 3.0 mm therebetween and define a flow passage extending therealong, and
an interval of time T for changing the polarity of the electrode plates can be set between about 0.5 and 60 seconds;
the method comprising a first step, a second step and a third step,
in the first step, introducing the liquid from the inlet into the flow passage,
in the second step, applying the direct current voltage across the two plates by the direct current power source and alternately changing the polarity of the two electrode plates at the interval of time T by the control circuit to produce electrolyzed water while the liquid is flowing through the flow passage, and
in the third step, the electrolyzed water being let out of the outlet,
the first, second and third steps being simultaneously and continuously executed.

5. The method according to claim 4, wherein a one of the two electrode plates is a perforated electrode plate having a plurality of through openings, while a remaining one of said two electrode plates is a non-perforated electrode plate.

6. A method of generating electrolytic water according to claim 4, wherein
said interval of time T is set between about 0.5 and 60 seconds,
whereby an amount of oxygen molecules gathered in a vicinity of a one of said first and second electrode plates is greater than another amount of oxygen molecules gathered in a vicinity of a remaining one of said first and second electrode plates, and an ozone concentration in the vicinity of said one of said first and second electrode plates is increased in comparison to another ozone concentration in the vicinity of the remaining one.

7. A method of producing electrolyzed water containing ozone by using an apparatus for producing electrolyzed water from a liquid;

the apparatus comprising:
an electrolytic cell;
an inlet means for allowing a liquid forced into the cell to flow through;
a first electrode plate placed in the cell;
a second electrode plate placed in the cell and facing the first electrode plate;
a direct current power source for applying a direct current voltage to the first and second electrode plates so as to produce a potential difference therebetween;
a control circuit for changing a polarity of the electrode plates alternately; and
an outlet pipe through which electrolyzed water produced in the cell is let out of the cell;

wherein: the first electrode plate is close to the second electrode plate and the two plates define a clearance of 3.0 mm or less between them and define a flow passage extending along them, and each of the electrode plates having non-perforated and perforated portions appearing alternately in the direction of flow of the liquid, the non-perforated portions of one of the electrode plates facing the perforated portions of the other;

the method comprising the step of introducing the liquid from the inlet means into the flow passage to let out the electrolyzed water from the outlet pipe.

8. A method of producing electrolyzed water containing ozone, comprising:

arranging first and second plate electrodes to face each other and being spaced apart from one another to define a flow passage therebetween extending therealong;

introducing a liquid into the flow passage;

applying a direct current voltage across the first and second plate electrodes; and alternately changing a respective polarity of the first and second plate electrodes back and forth at an interval of time effective for producing electrolyzed water containing ozone while the liquid is flowing through the flow passage.

9. The method according to claim 8, further comprising letting the electrolyzed water out of the flow passage.

10. The method according to claim 8, wherein said steps of introducing, applying and alternately changing are simultaneously and continuously executed.

11. The method according to claim 8, wherein the interval of time T is defined by formula (10):

$$0.5\ (sec.) \leq T \leq (1/3) \times (L/V) \qquad (10)$$

wherein;

V: The velocity of flow of the liquid in the flow passage (cm/sec.), and

L: The length of the two electrodes as measured in the direction of flow of the liquid (cm).

12. The method according to claim 8, wherein a clearance between the first and second plate electrodes is no greater than about 3 mm.

13. The method according to claim 8, wherein a one of said first and second plate electrodes is a perforated electrode plate having a plurality of through openings, and a remaining one of said first and second plate electrodes is a non-perforated electrode plate.

14. The method according to claim 8, wherein the interval of time is determined as a function of a velocity of flow of the liquid in the flow passage and a length of the two electrodes as measured in the direction of flow of the liquid.

* * * * *